(12) United States Patent
D'Amico et al.

(10) Patent No.: US 9,611,090 B1
(45) Date of Patent: Apr. 4, 2017

(54) OPEN ACCESS WATER TANK TRUCK BODY

(71) Applicant: Mine Rite Technologies, LLC, Buffalo, WY (US)

(72) Inventors: John A. D'Amico, Casper, WY (US); Dennis A. Frank, Buffalo, WY (US)

(73) Assignee: Mine Rite Technologies, LLC, Buffalo, WY (US)

( * ) Notice: Subject to any disclaimer, the term of this patent is extended or adjusted under 35 U.S.C. 154(b) by 48 days.

(21) Appl. No.: 14/920,998

(22) Filed: Oct. 23, 2015

(51) Int. Cl.
| B60P 3/22 | (2006.01) |
| B65D 88/12 | (2006.01) |
| B65D 90/52 | (2006.01) |
| B65D 90/00 | (2006.01) |
| B65D 88/54 | (2006.01) |

(52) U.S. Cl.
CPC ............ B65D 88/123 (2013.01); B60P 3/221 (2013.01); B60P 3/2235 (2013.01); B60P 3/2245 (2013.01); B65D 88/54 (2013.01); B65D 90/004 (2013.01); B65D 90/52 (2013.01); *B60Y 2200/41* (2013.01)

(58) Field of Classification Search
CPC .... B65D 88/123; B65D 88/54; B65D 90/004; B65D 90/52; B60P 3/221; B60P 3/2235; B60P 3/2245; B60Y 2200/41
See application file for complete search history.

(56) References Cited

U.S. PATENT DOCUMENTS

| 2,832,501 | A | | 4/1958 | Durand | |
| 3,192,877 | A | | 7/1965 | Wright | |
| 4,251,005 | A | * | 2/1981 | Sons | B65D 88/06 105/360 |
| 4,389,314 | A | * | 6/1983 | Petretti | B01D 21/0012 210/241 |
| 4,662,287 | A | * | 5/1987 | Connell | A62B 99/00 109/1 S |
| 5,630,625 | A | * | 5/1997 | Shaw | B60G 11/27 180/209 |
| 7,604,256 | B2 | | 10/2009 | Reber | |
| 2007/0096453 | A1 | | 5/2007 | Reber | |
| 2014/0361019 | A1 | | 12/2014 | Caroleo et al. | |
| 2015/0352945 | A1 | * | 12/2015 | Matusek | F02M 37/103 220/563 |
| 2016/0221218 | A1 | * | 8/2016 | Connard, III | B28C 5/4203 |

* cited by examiner

*Primary Examiner* — Anne Marie Boehler
*Assistant Examiner* — Marlon A Arce
(74) *Attorney, Agent, or Firm* — Antoinette M. Tease

(57) ABSTRACT

A water truck body comprising a floor, two side walls, a front wall, and a rear wall, a plurality of cylindrical baffle bodies with open bottom ends, a top plate situated on top of each of the cylindrical baffle bodies so that the cylindrical baffle body is centered underneath the top plate, and a tubular support structure. Each of the plurality of cylindrical baffle bodies comprises a plurality of apertures configured to permit liquid to flow through them. The tubular support structure is configured to hold the top plates and provide structural stability to the side walls, front wall and rear wall.

18 Claims, 17 Drawing Sheets

OPEN ACCESS WATER TANK TRUCK BODY

BACKGROUND OF THE INVENTION

1. Field of the Invention

The present invention relates generally to the field of vehicles used in the mining and construction industries, and more particularly, to a water truck body with an integral open access water tank comprised of a plurality of perforated steel cylinders arranged within a tubular steel support system.

2. Description of the Related Art

Water tanks are typically used in the mining and construction industry for fugitive dust control and haul road safety, among other things. In conventional water tucks, the water tank itself is made of a walled steel baffle system in which separate walled compartments are configured within generally rectangular and/or rounded steel outer walls. The inner walls have holes in them to allow water to pass from one inner compartment into another. The entire tank is capped with a steel ceiling that is welded to the outer walls. The steel ceiling comprises one or more manholes and a fill access port. Baffle systems are typically used within the tank of a water truck to sequester and encapsulate the water within compartments, thereby minimizing water surges that can cause vehicular water tanks to roll over.

During use and over time, the water sloshing within a conventional water tank can cause the baffle system to be damaged and require maintenance. (As the tank empties, the sloshing velocity increases, which causes further problems.) With a conventional walled steel baffle system, personnel must enter the tank to complete the needed repairs. which creates a "confined space" hazard situation. As an individual moves from compartment to compartment within the tank, regardless of whether the compartments (or chambers) are accessed through an open hatch or a hatch with a door, the further the individual goes into the tank, the greater the potential for confined space hazard becomes.

The present invention solves this problem by providing a baffle system that is removable for servicing or maintenance outside of the tank, thereby requiring no physical entry into the tank by a person. Once all of the perforated steel cylinders (baffles) of the present invention have been removed, the entire tank is open at the top, which allows for inspection and/or maintenance of the internal support structure that entraps the baffles when in place. Not only is there no need to enter the tank for baffle servicing, but also there is no longer any confined space within the tank.

There has been some innovation in the field of vehicular tanks for carrying fluids such as fuels, oils and water. For example, U.S. Pat. No. 2,832,501 (Durand, 1956) discloses a tank with a centrally disposed baffle plate. The baffle plate has no corners so as to permit restricted flow of liquid within the tank, thereby preventing rapid shifting of liquid. A plurality of cylindrical baffles is situated within the tank. Each cylindrical baffle has inwardly extending notches (or bevels) on opposite sides of the baffle and at each end of the baffle for restricting flow of liquid within the tank. The notches in the cylindrical baffles are misaligned with the omitted corners of the baffle plate so as to cause a tortuous path of flow for the liquid.

U.S. Pat. No. 3,102,877 (Wright, 1965) provides a tank with movable baffles. Each baffle member has an outer wall and a generally hollow interior, as well as an opening in the wall to permit liquid to flow relatively freely into and out of the baffle member. The baffle members are supported so that they can move generally parallel to the direction of acceleration of the tank independently of one another and of the tank itself. The baffle members serve to minimize surging of liquid within the tank, dissipate the energy of the liquid, and prevent development of excessive liquid pressures. In a preferred embodiment, each baffle member is a commercially available circular cross-sectioned 55-gallon steel drum, modified by having both ends removed.

U.S. Pat. No. 7,604,256 (Reber, 2009) discloses a baffling system for vehicle-mounted tanks in which circular disc-shaped head baffles are antipodally positioned with respect to each other; these disc-shaped head baffles attenuate forward- and rearward-directed liquid surges. The baffling system further comprises a plurality of longitudinal baffles that attenuate side-to-side liquid surges. The longitudinal baffles are preferably mounted parallel to the longitudinal axis of the tank and positioned below a horizontal plane through the center of the tank.

U.S. Patent Application Pub. No. 2014/0361019 (Caroleo et al.) provides a tank with a main chamber and a plurality of sub-chambers within the main chamber. The sub-chambers are preferably cylindrical in shape with a bottom end and a top end. The top ends of the sub-chambers are adapted to be received by openings in the top of the tank so that the top ends of the sub-chambers can be accessed from the top of the tank. The bottom ends of the sub-chambers are adapted to be received by indentations in the bottom of the tank; in one embodiment, the bottom end is supported by a wedge. Gates that are releasably attached to the sub-chambers and located at the bottom and top ends of the sub-chambers allow access to the interior of the sub-chambers. In one embodiment, the gate on the bottom end of the sub-chamber is semi-circular in shape, which allows only a portion of the bottom end of the sub-chamber to be releasably closed by the gate. In a preferred embodiment, pairs of the cylindrical sub-chambers are arranged longitudinally within the main chamber, and each cylindrical sub-chamber is attached to its respective adjacent cylindrical sub-chamber and to the inner surface of the wall of the main chamber via plates.

BRIEF SUMMARY OF THE INVENTION

The present invention is a water truck body comprising a floor, two side walls, a front wall, and a rear wall, a plurality of cylindrical baffle bodies with open bottom ends, a top plate situated on top of each of the cylindrical baffle bodies so that the cylindrical baffle body is centered underneath the top plate, and a tubular support structure; wherein each of the plurality of cylindrical baffle bodies comprises a plurality of apertures configured to permit liquid to flow through them; and wherein the tubular support structure is configured to hold the top plates and provide structural stability to the side walls, front wall and rear wall. In a preferred embodiment, the cylindrical baffle bodies are arranged in lateral and longitudinal rows within the truck body. The apertures in the cylindrical baffle bodies preferably extend from top to bottom of the baffle body and around an entire circumference of the baffle body.

In a preferred embodiment, the invention further comprises a trough that extends downward from a center of a bottom surface of the floor and a plurality of apertures in the center of the bottom surface of the floor to allow liquid to drain from the truck body into the trough. Preferably, the flour has a first side and a second side, and the floor slopes downward from the first side to a center of the floor and from the second side to the center of the floor so as to direct liquid to the center of the floor and into the trough via the apertures in the center of the bottom surface of the floor. The invention preferably further comprises a first horizontally oriented access porthole at a front of the trough and a second vertically oriented access porthole situated in a rear wall of the trough. The trough preferably comprises two side walls that diminish in length from rear to front and terminate at a point directly above the first access porthole.

In a preferred embodiment, the invention further comprises an inlet comprised of a perforated top plate and four contiguous side walls that extend upward from the perforated top plate at an angle to form a funnel for directing liquid into the inlet and through the perforated top plate, the perforated top plate being situated within a first part of the tubular support frame. Preferably, the front wall, two side walls, and rear wall form a compartment that contains the baffle bodies, each of the top plates has a top surface, the compartment has a top edge, and the top surfaces of the top plates are lower than the top edge of the compartment to form a spill lip around a perimeter of the compartment.

In a preferred embodiment, the tubular support structure is comprised of a grid of tubular support members that extend laterally and longitudinally across an inside of the compartment. Preferably, the tubular support structure is comprised of a first part that is situated in a top part of the compartment and a second part that is situated in a center of the compartment. The first part of the tubular support structure preferably forms a plurality of portals that hold the top plates. Each of the portals preferably comprises a platform that extends inwardly around the perimeter of the portal and that is configured to hold a bottom surface of the top plate.

In a preferred embodiment, the invention further comprises a baffle locator situated on the floor directly underneath each of the portals, the baffle locator being comprised of metal plates configured to form a cross shape with tapered ends to facilitate placement of a bottom end of the baffle body over the baffle locator. In one embodiment, each of the top plates comprise a baffle locator situated and centered on a bottom surface of the top plate, the baffle locator being comprised of metal plates configured to form a cross shape with tapered ends to facilitate placement of a top end of the baffle body over the baffle locator.

In a preferred embodiment, the floor is slanted downward from the rear wall to the front wall so that the floor is higher where it joins the rear wall than where it joins the front wall. Preferably, each of the baffle bodies comprises one or more coupler rings that secure joints between different sections of the cylindrical baffle body. Each of the top plates preferably comprises a handle and an upwardly extending rim that extends around a perimeter of the top plate.

REFERENCE NUMBERS

Figure 1:
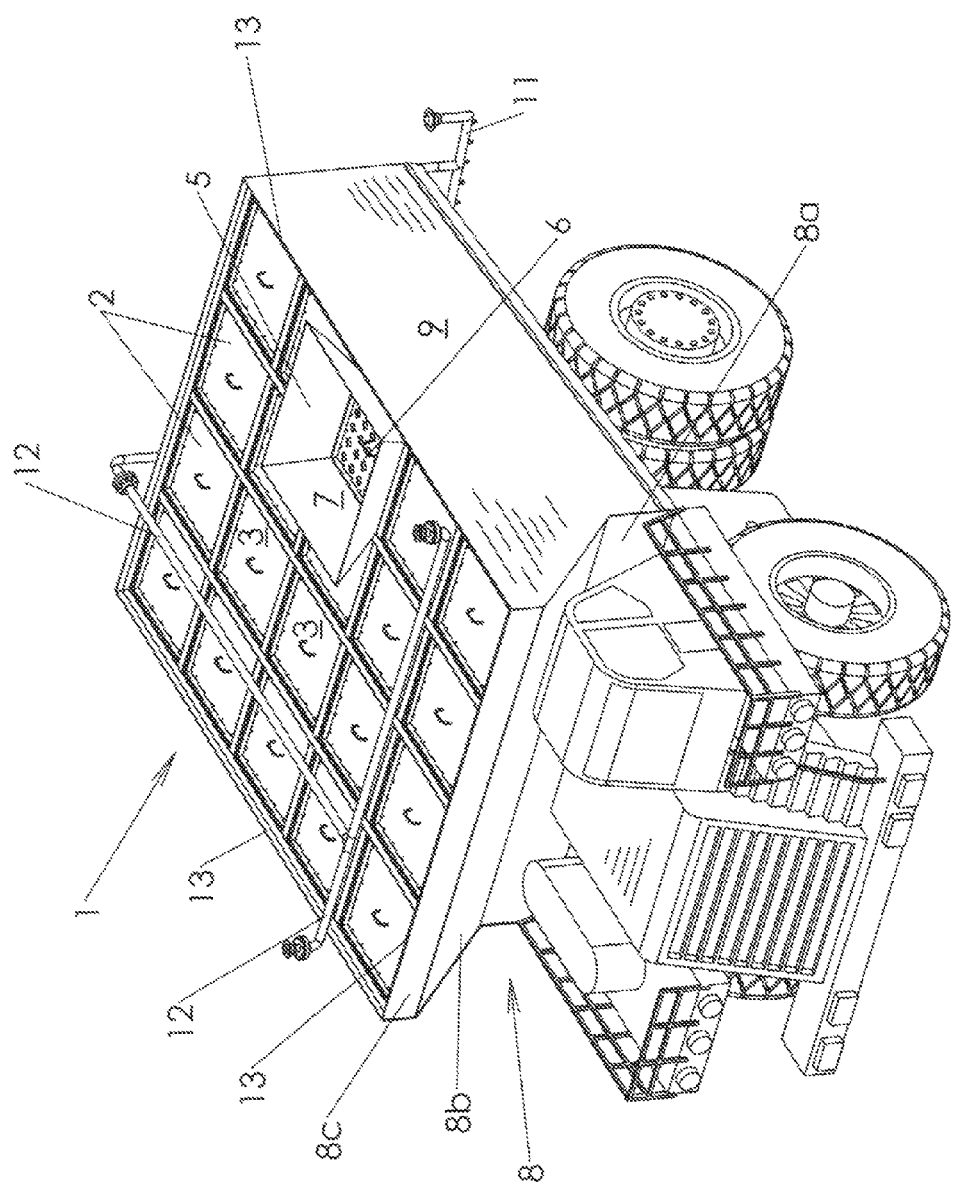
FIG. 1 is a front perspective view of the present invention.

1 Truck body
2 Baffle member
3 Top plate (of baffle member)
4 Baffle body (of baffle member)
4a Perforation (in baffle body)
5 Inlet
6 Perforated top plate (of inlet)
7 Side wall (of inlet)
8 Front wall
8a Vertical bottom panel (of front wall)
8b Intermediate panel (of front wall)
8c Vertical top panel (of front wall)
9 Side wall (of truck body)
10 Rear wall (of truck body)
11 Spray bar
12 Piping
13 Top edge (of compartment)
14 Trough
14a Rear wall (of trough)
14b Side wall (of trough)
14c Bottom wall (of trough)
14d Aperture (in floor of truck body/ceiling of trough)
14e Outlet
Floor (of truck body)
16 Bolt
17 Tubular support structure
17a First part (of tubular support structure)
17b Second part (of tubular support structure)
18 First access porthole
19 Second access porthole
20 Bracket
21 Baffle locator
21a First plate (of baffle locator)
21b Second plate (of baffle locator)
22 Handle
23 Rim (of top plate)
24 Platform (in portal formed by top part of tubular support structure)
25 Coupler ring

DETAILED DESCRIPTION OF INVENTION

FIG. 1 is a front perspective view of the present invention. As shown in this figure, the present invention is a truck body 1 comprised of a plurality of individually removable baffle members 2. Each baffle member comprises a top plate 3 and a baffle body 4 (see FIG. 8). The top plates 3 of the baffle members 2 are preferably solid (not perforated). The baffle bodies 4 are preferably fabricated from rolled steel plate, corrugated metal pipe, or plastic pipe.

Figure 13:
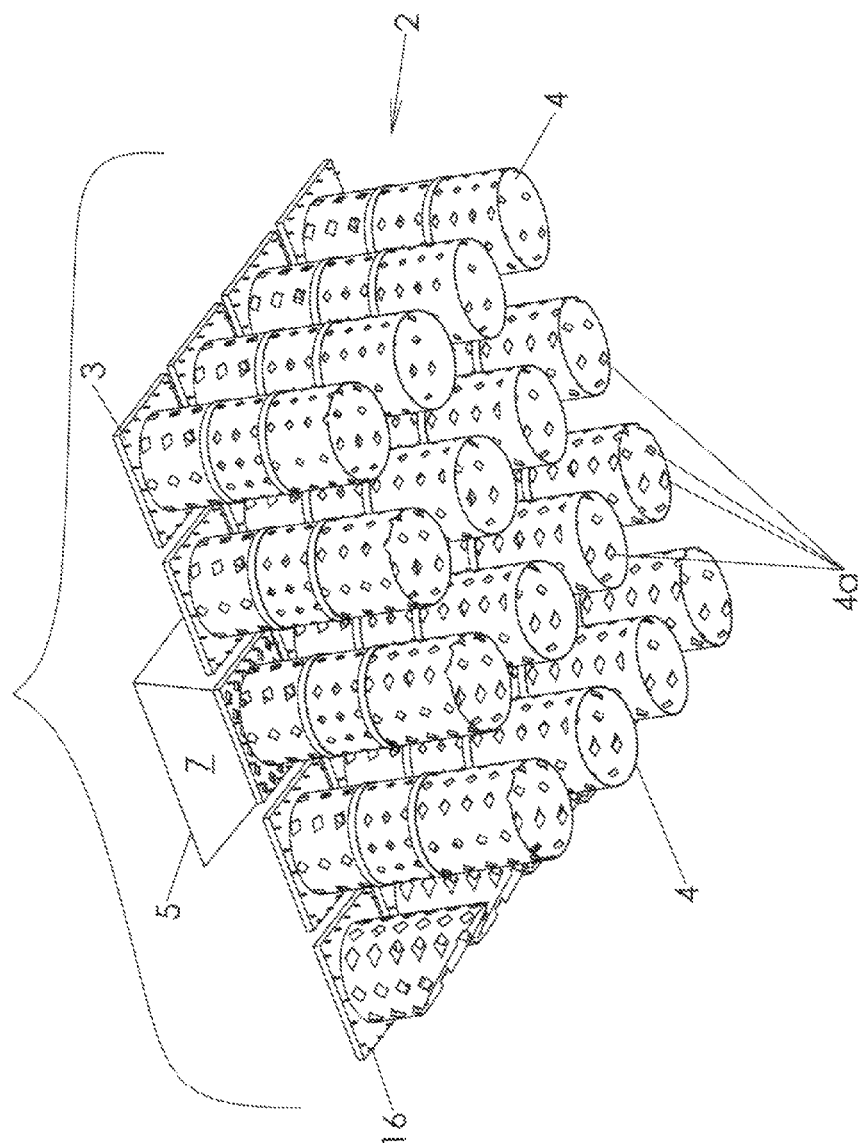
FIG. 13 is a bottom perspective view of the baffle members of the present invention.

The invention further comprises an inlet 5 with a perforated top plate 6 and four contiguous side walls 7 that extend upward from the perforated top plate at an angle (and on all four sides of the perforated top plate 6) so as to form a funnel for directing liquid into the inlet 5 and through the perforated top plate 6. In the embodiment shown in FIG. 1, there are twenty (20) individual baffle members 2 (see also FIG. 13); however, the present invention is not limited to any particular number of baffle members. For ease of manufacturing, the baffle members 2 are preferably arranged in rows (in five lateral rows and four longitudinal rows in the example shown in FIG. 1), and each baffle member 2 is the same size as the other baffle members, with the exception of length. The length of each individual baffle member 2 may vary, as shown in FIG. 13.

Figure 2:
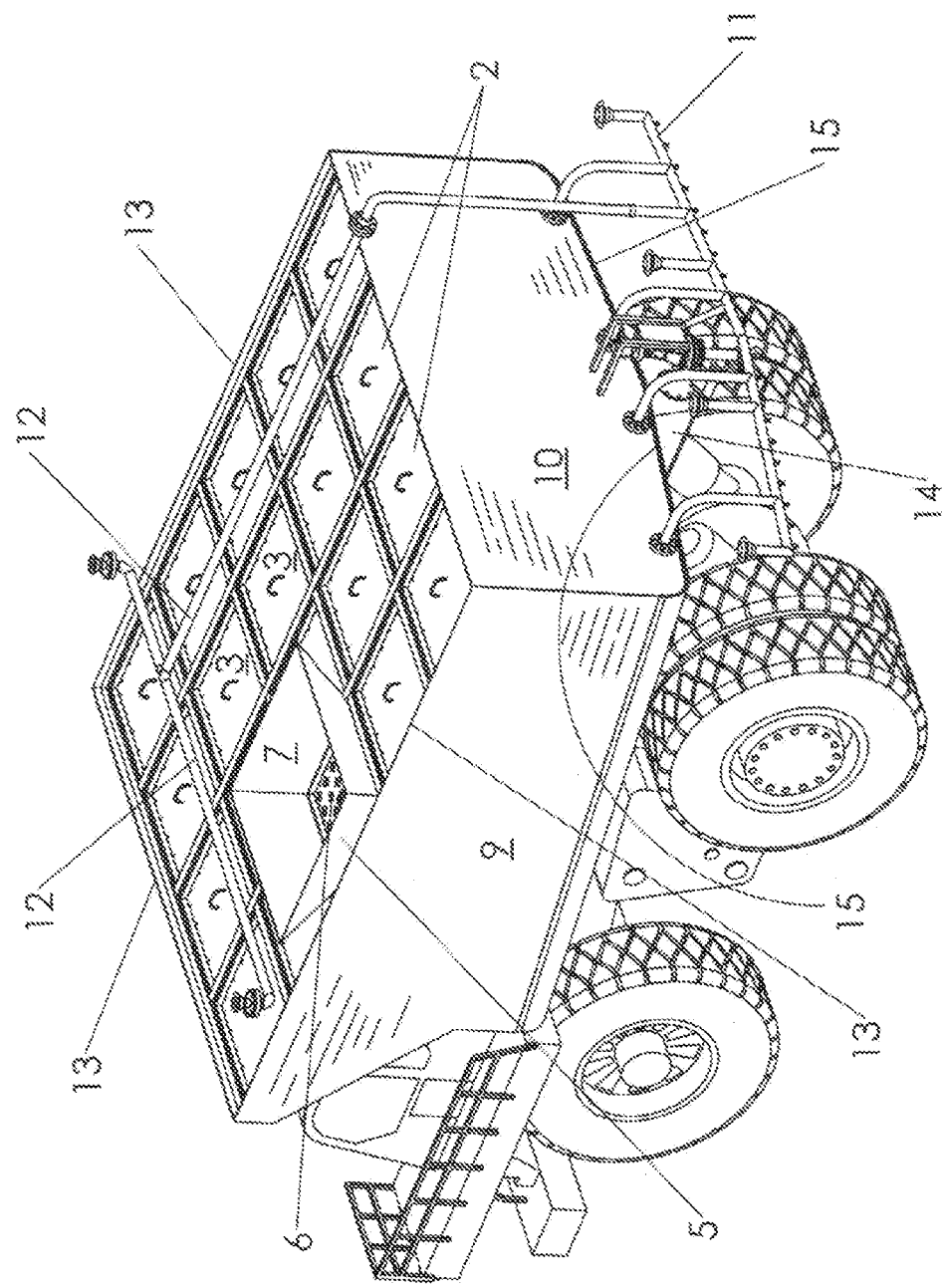
FIG. 2 is a rear perspective view of the present invention.

In addition to the baffle members 2, the truck body 2 further comprises a cantilevered front wall 8, two side walls 9, and a rear wall 10 (see FIG. 2). The front wall 8 comprises a vertical bottom panel 8a, an angled intermediate panel 8b, and a vertical top panel 8c, which is preferably shorter than the vertical bottom panel 8a. The intermediate panel 8b is situated between the vertical bottom panel 8a and the vertical top panel 8c and is at roughly a forty-five (45)-degree angle relative to the vertical top and bottom panels 8c, 8a. The vertical top panel 8c and vertical bottom panel 8a are preferably parallel to one another (see FIG. 4), and the vertical top panel 9c is offset laterally from the vertical bottom panel 8a. The vertical top panel 8c is also higher than the vertical bottom panel 8a by virtue of the intermediate panel 8b.

The two side walls 9 of the present invention are preferably parallel to one another (see FIG. 5) and are welded to the front and rear panels 8, 10. FIG. 1 also shows various spray bars and related piping 11, which are not part of the present invention but are shown for environmental purposes. The front wall 8, side walls 9 and rear wall 10 form a compartment that contains the baffle members 2, and the top plates 3 of the baffle members 2 are preferably recessed inside of the compartment so that the top surface of the top plates 3 is lower than the top edge 13 of the compartment. The top edge 13 of the compartment formed by the front wall 8, side walls 9 and rear wall 10 acts as a spill lip to prevent liquid from spilling out of the compartment.

Figure 5:
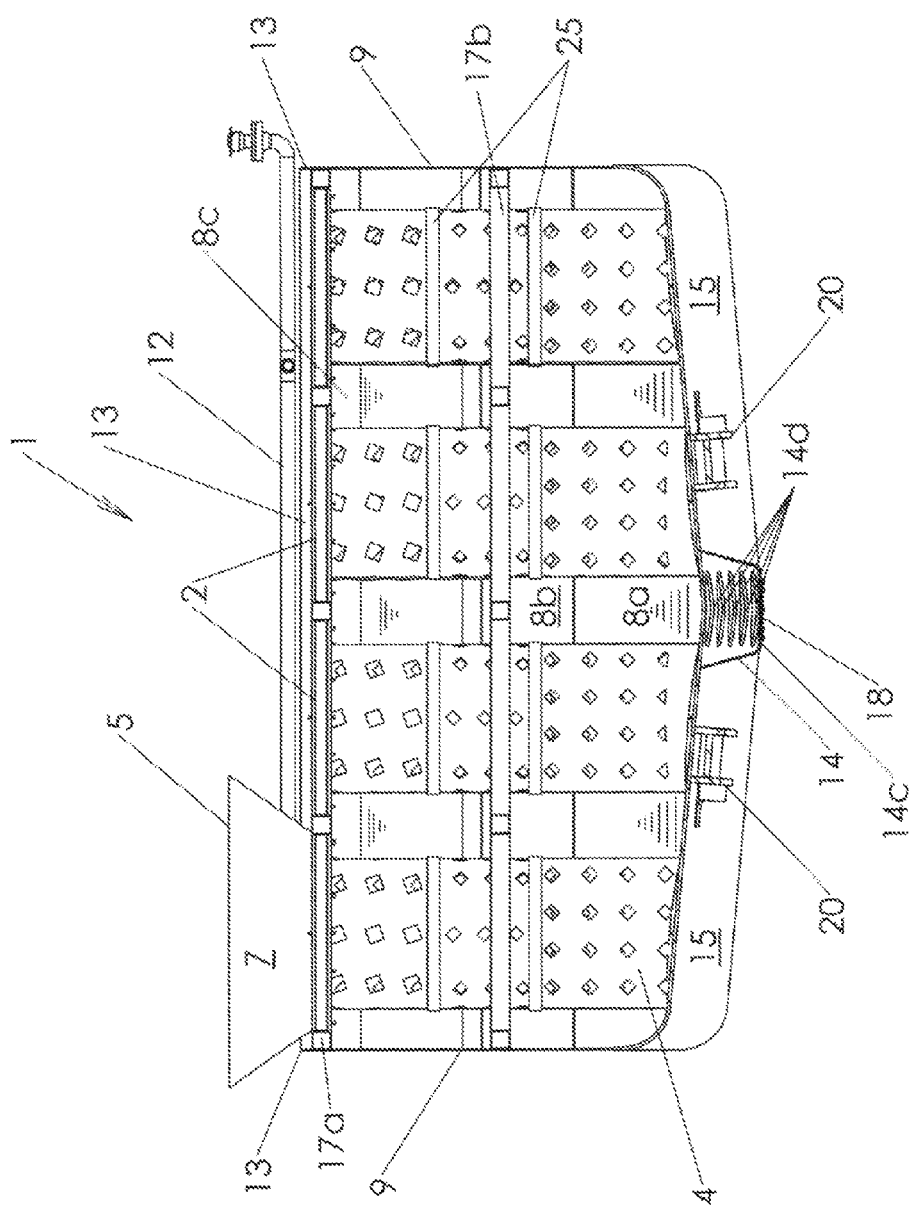
FIG. 5 is a lateral section view of the present invention shown with the truck chassis omitted.

FIG. 2 is a rear perspective view of the present invention. This figure shows the rear wall 10 of the invention. It also shows the trough 14, which extends downward from the outside bottom surface of the floor 15 and is preferably centered (right to left) relative to the floor 15. (The trough is shown more clearly in FIG. 6.) Note that the floor 15 is preferably angled so that the truck body 1 is deeper in the center than it is on the sides; this angling of the floor 15 is also shown in FIG. 5. In a preferred embodiment, the angle of the floor is preferably five (5) degrees relative to the side walls 9. The purpose of this angle is to direct liquid to the center of the floor 15, where it will drain into the trough 14.

Figure 3:
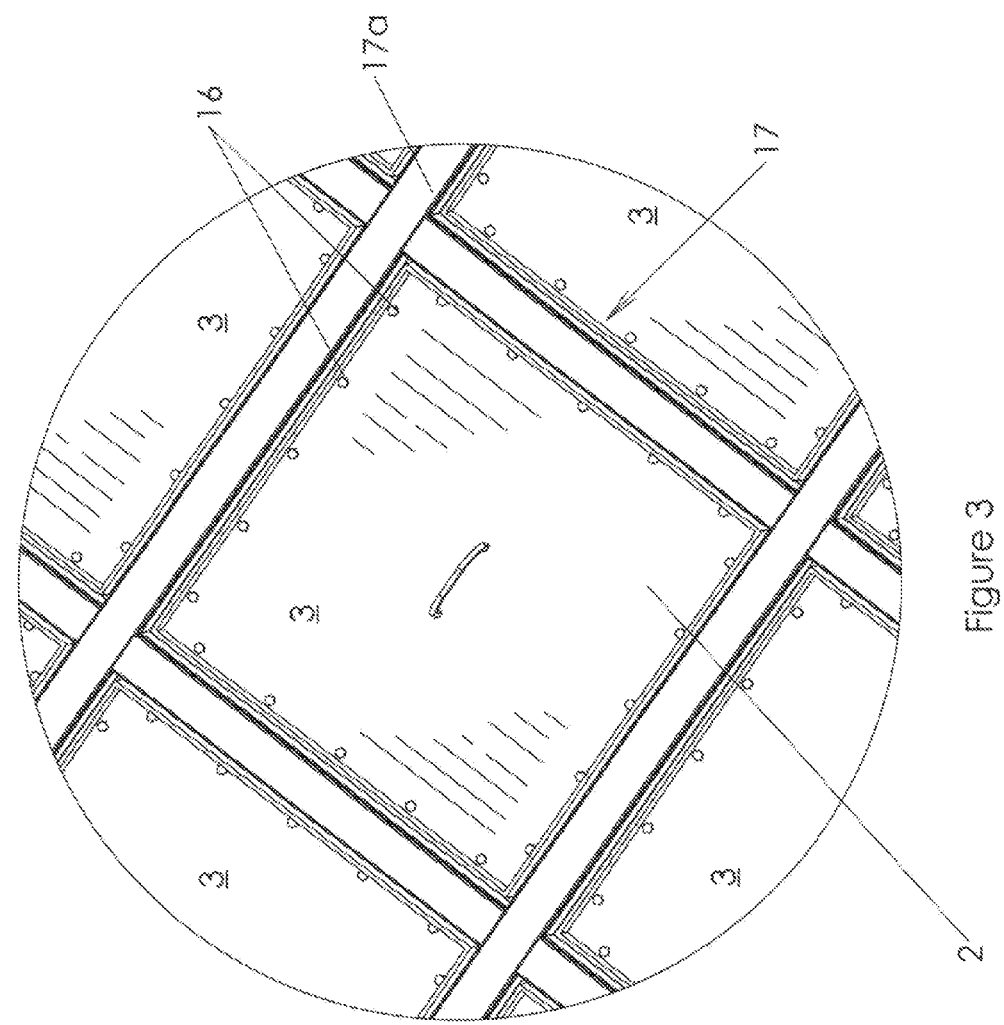
FIG. 3 is a detail view of the top plate of a baffle member of the present invention.

FIG. 3 is a detail view of the top plate of a baffle member of the present invention. The top plate 3 of each baffle member 2 is preferably secured via bolts 16 to the tubular support structure 17 of the present invention. The tubular support structure 17 is preferably comprised of a grid of tubular support members that extend laterally and longitudinally across the inside of the compartment formed by the front wall 8, side walls 9 and rear wall 10. The tubular support structure 17 serves to retain the baffle members 2 and also to provide structural support to the exterior walls of the truck body 1.

Figure 8:
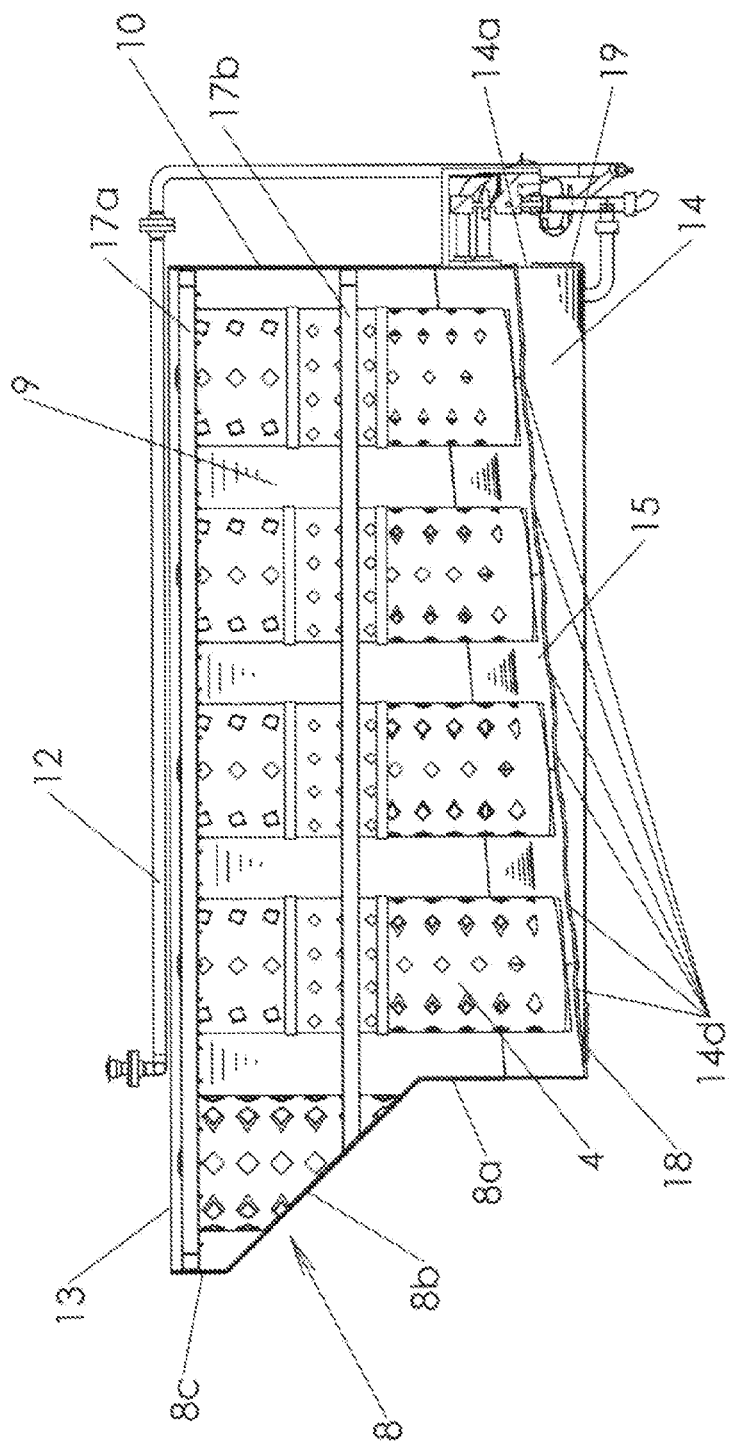
FIG. 8 is a longitudinal section view of the present invention shown with the truck chassis omitted.

In a preferred embodiment, there are two parts to the tubular support structure—a first part 17a that is situated toward the top of the compartment and a second part 17b that is situated in roughly the center of the compartment (see FIG. 8). The tubular support structure 17 forms a plurality of square portals through which the baffle members 2 are inserted. In a preferred embodiment, each of the square portals formed by the tubular support structure 17 is the same size. The top plates 3, which are also square, are affixed to the first part 17a of the tubular support structure only (see FIG. 16); they are not affixed to the second part 17b of the tubular support structure or to any other part of the truck body. This latter point is important because the baffle members 2 must be easily removable. Because they are bolted only to the top part 17a of the tubular support structure 17, the baffle members 2 can be removed by simply removing the bolts 16 shown in FIG. 3 and lifting the baffle member 2 upward through the portal.

Figure 4:
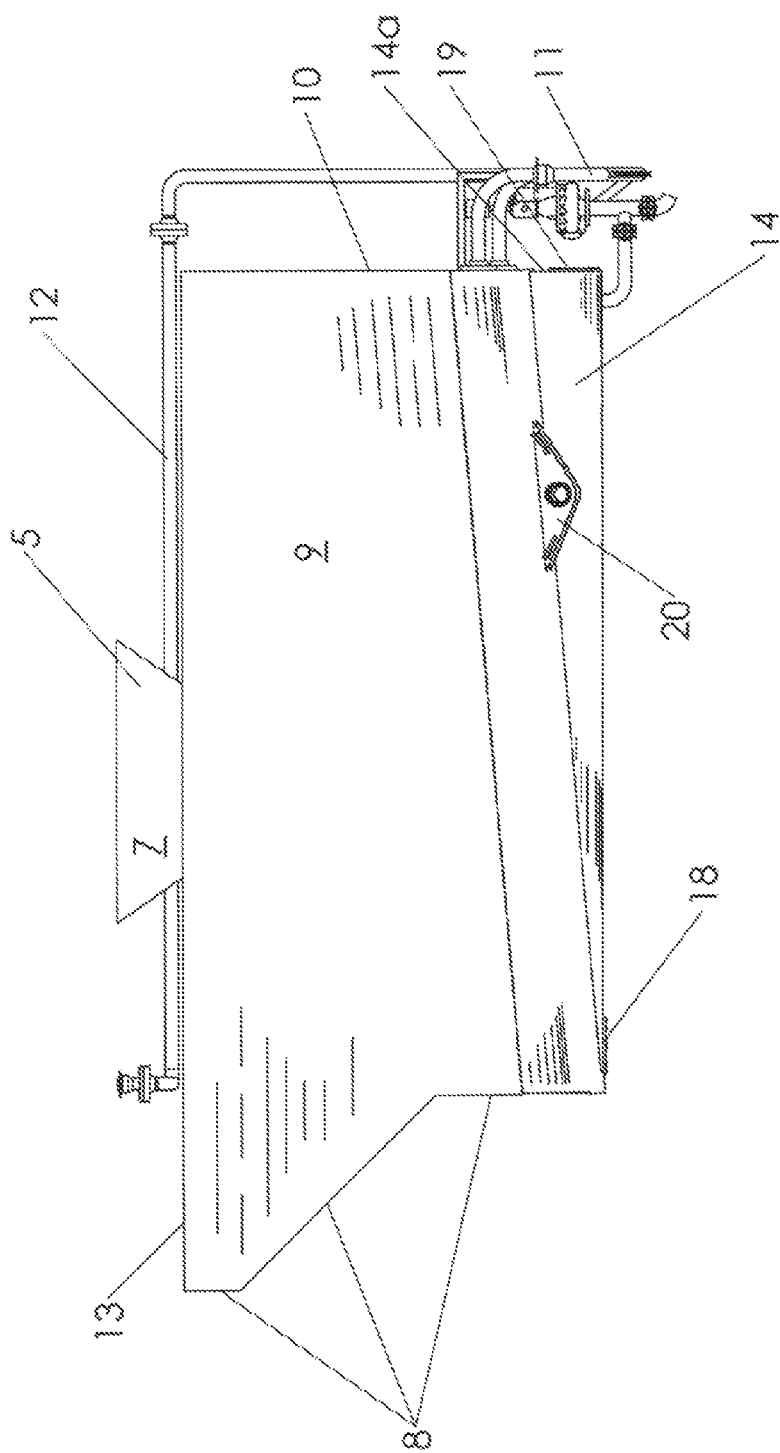
FIG. 4 is a side view of the present invention shown with the truck chassis omitted.

FIG. 4 is a side view of the present invention shown with the truck chassis omitted. As shown in this figure, the floor 15 (see also FIG. 8) is preferably slanted downward from the rear to the front of the truck so that the floor is higher toward the rear of the truck and lower toward the front of the truck. (In a preferred embodiment, the angle of the floor relative to the front wall is five (5) degrees.) For this reason, the baffle members 2 in each successive lateral row of baffle members are longer than the baffle members 2 in the previous lateral row (that is, rear to front), as shown in FIG. 8. The reason for this slant in the floor 15 of the truck body is to direct dirt and debris (along with liquid flow) to a first access porthole 18 at the front of the trough 14. The first access porthole 18 is preferably situated horizontally on the bottom of the trough and opens downward to allow access to the trough 14 via a manhole cover. A second access porthole 19 is preferably situated vertically on the rear wall 14a of the trough 14 and opens outward to allow access to the trough 14 (also via a manhole cover) from the rear of the truck. Liquid inside of the trough 14 may be pumped out of the trough via an outlet 14e.

The entire truck body 1 pivots on a mounting pin (not shown). The mounting pin of the truck body extends through a pair of brackets 20 (see also FIG. 6) that are welded to the bottom of the truck body 1 on either side of the trough 14.

FIG. 5 is a lateral section view of the present invention shown with the truck chassis omitted. As shown in this figure, the baffle bodies 4 preferably comprise coupler rings 25 that secure the joints between different sections of the cylindrical baffle body.

Figure 6:
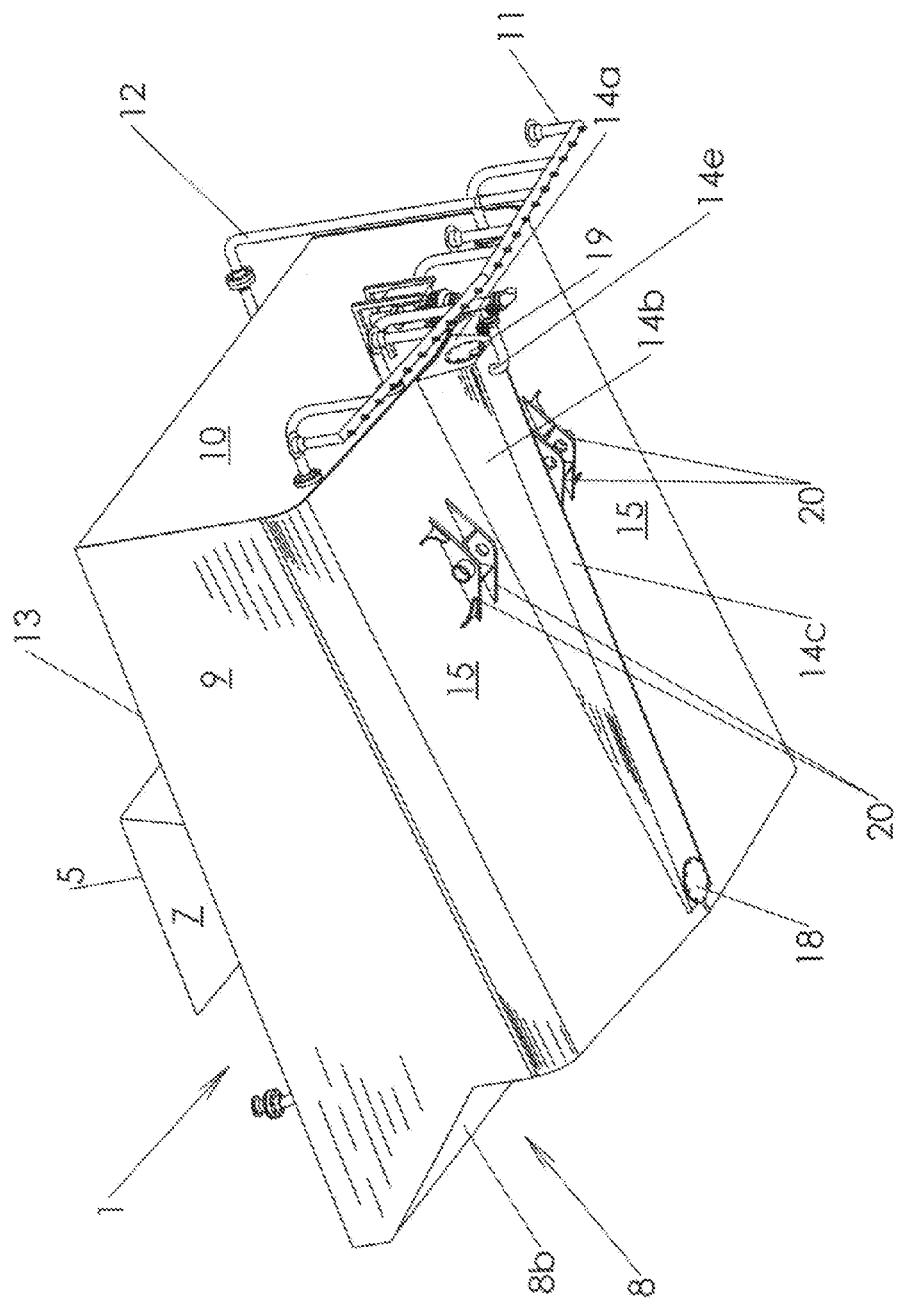
FIG. 6 is a bottom perspective view of the present invention shown with the truck chassis omitted.

FIG. 6 is a bottom perspective view of the present invention shown with the truck chassis omitted. As shown in both this figure and FIG. 4, although the trough 14 has a floor that is relatively horizontal when the truck body is in a normal operating position (as shown in FIG. 4), the ceiling of the trough 14 is slanted to mimic the slant in the floor 15 of the truck body itself. Thus, the trough 14 is deeper at the rear of the trough than it is at the front of the trough 14. In a preferred embodiment, there is no front wall to the trough 14 at all; rather, the side walls 14b of the trough diminish in length (rear to front) until they terminate at a point directly above the first access porthole 18.

Figure 7:
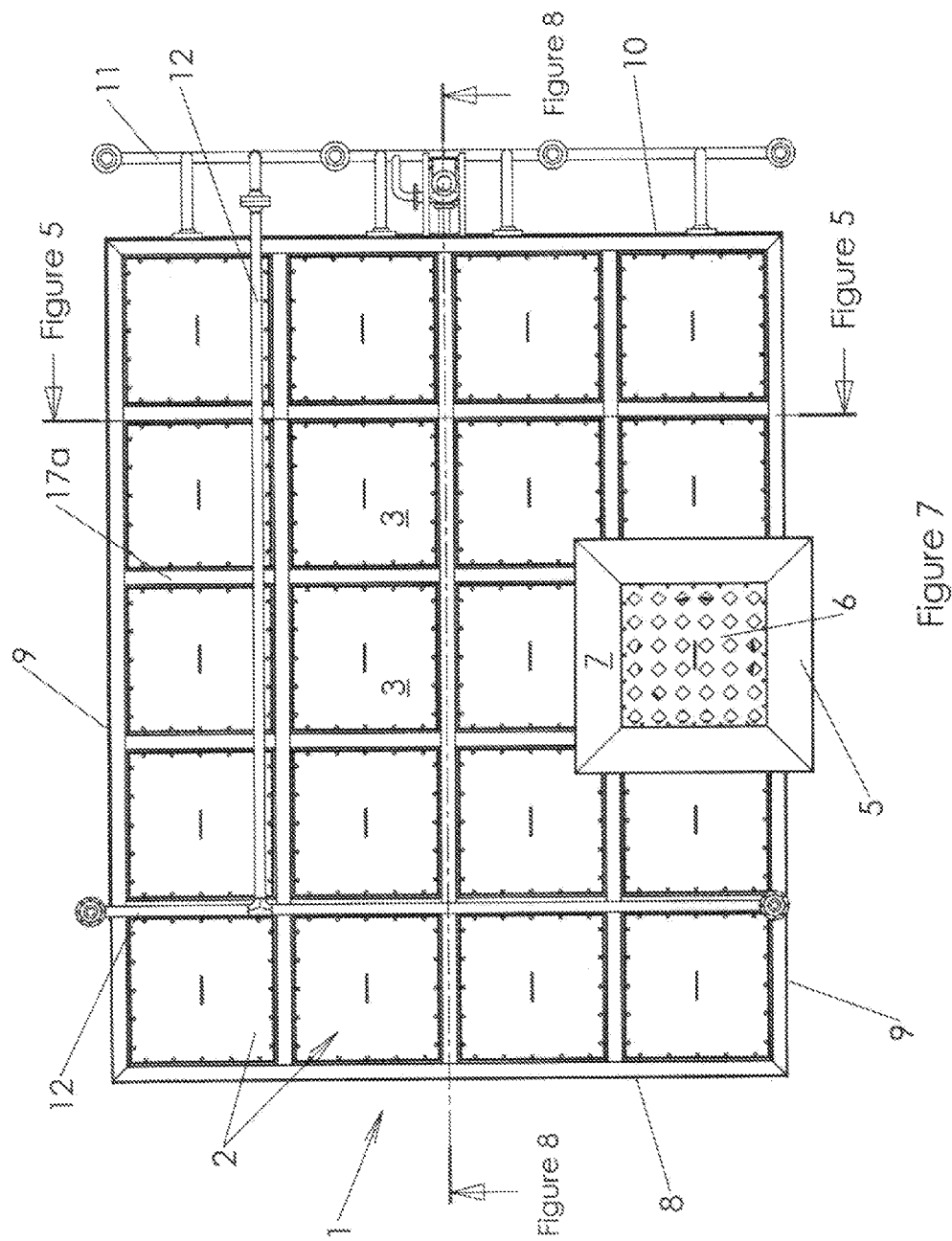
FIG. 7 is a top view of the present invention shown with the truck chassis omitted.

FIG. 7 is a top view of the present invention shown with the truck chassis omitted. This figures shows where the section views of FIGS. 5 and 8 are taken.

FIG. 8 is a section view of the present invention shown with the truck chassis omitted. This figure clearly shows the slope in the floor 15 of the truck body and the corresponding slope in the ceiling of the trough 14, as described above. It also shows that there are a plurality of apertures 14*d* in the floor 15 of the truck body (which is the ceiling of the trough 14); these apertures 14*d* allow liquid to escape from the compartment formed by the front wall 8, side walls 9 and rear wall 10 of the truck body into the trough 14.

Figure 9:
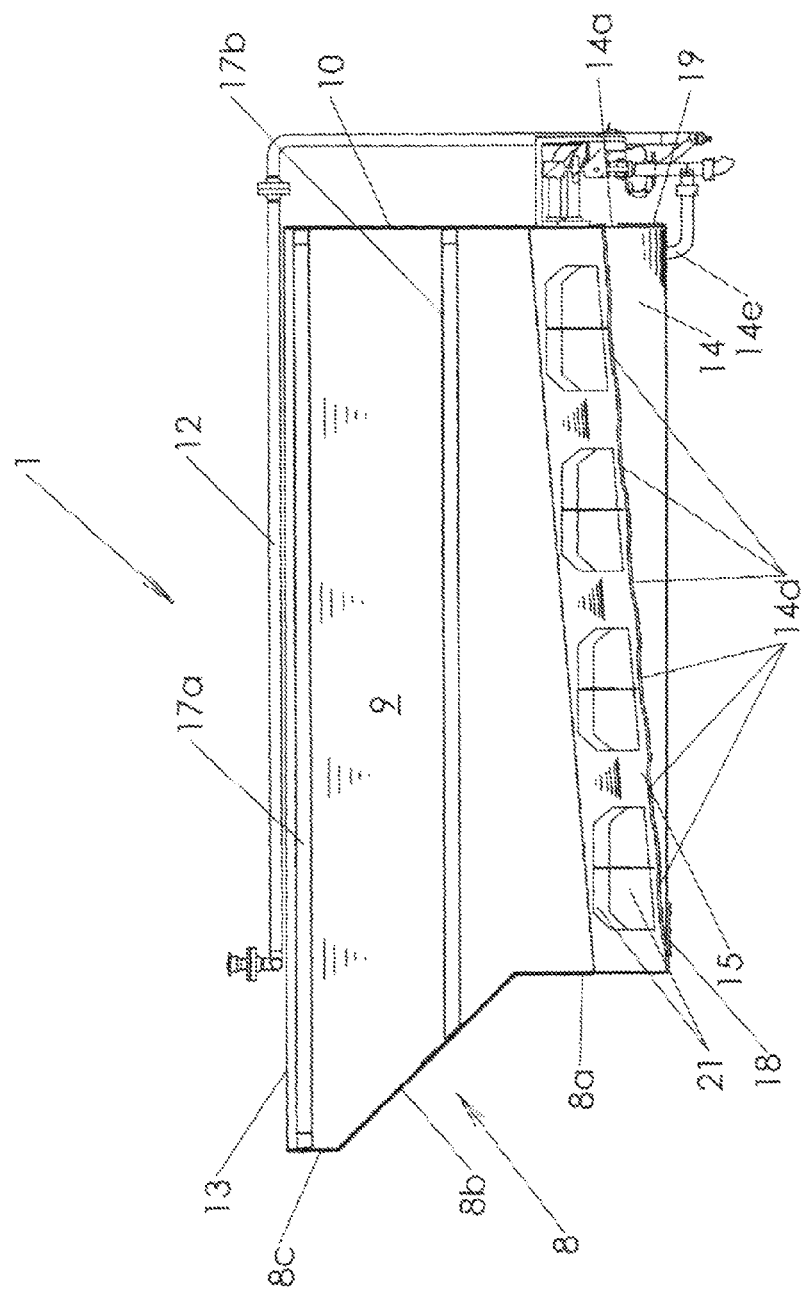
FIG. 9 is a section view of the present invention shown with the truck chassis omitted and the baffle members removed.

FIG. 9 is a section view of the present invention shown with the truck chassis omitted and the baffle members removed. As shown in this figure, the invention further comprises a plurality of baffle locators 21 that are situated on (welded to) the floor 15 of the truck body. In this figure, two sets (front to rear) of baffle locators 21 are shown; however, in the preferred embodiment shown in the figures, there are four sets (front to rear) of baffle locators 21. Each baffle locator 21 is situated directly underneath a portal formed by the top part 17*a* of the tubular support structure 17. In the preferred embodiment shown in the figures there are twenty (20) baffle locators 21.

Figure 10:
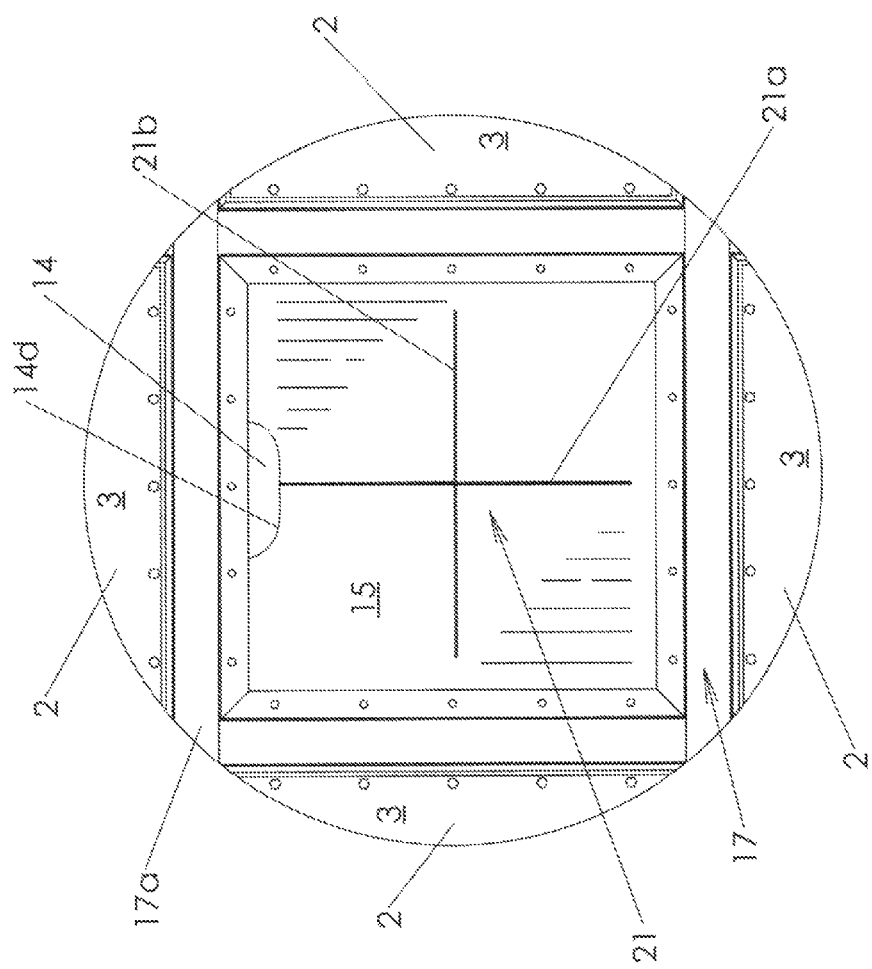
FIG. 10 is a top detail view of the floor of the present invention shown with the baffle member removed.

FIG. 10 is a top detail view of the floor of the present invention shown with the baffle member removed. As shown in this figure, each baffle locator 21 is comprised of a first plate 21*a* and a second plate 21*b* that are oriented perpendicularly to one another, with their center points aligned, to form a cross shape. The baffle locator 21 is preferably centered within the portal, as shown.

Figure 11:
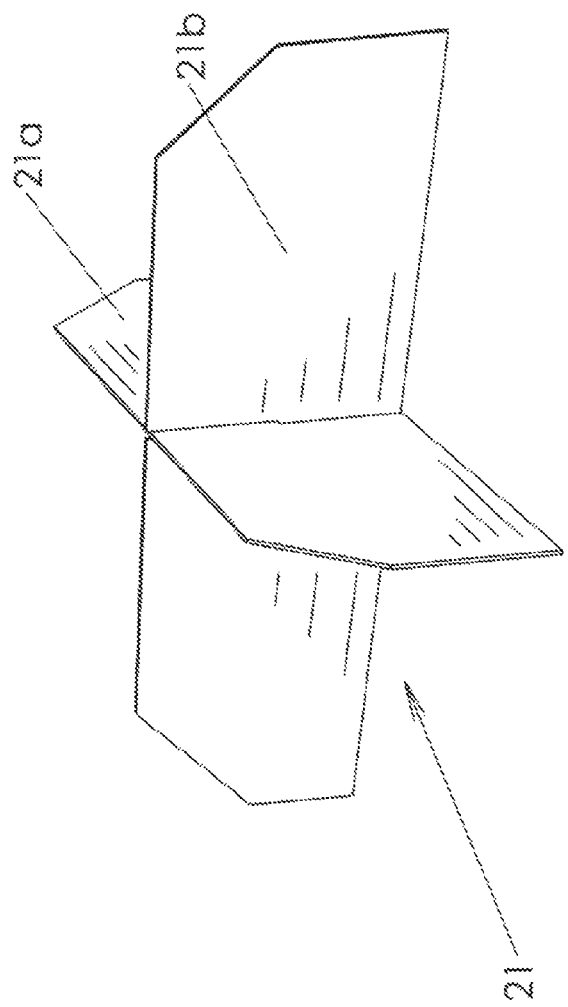
FIG. 11 is a perspective view of the baffle locator of the present invention.

FIG. 11 is a perspective view of the baffle locator of the present invention. As shown in this figure, the first plate 21*a* preferably comprises a slot that extends from the center top of the first plate 21*a* and terminates at approximately a center point of the first plate 21*a*. Similarly, the second plate 21*b* preferably comprises a slot that extends from the center bottom of the second plate 21*b* and terminates at approximately a center point of the second plate 21*b*. In this manner, the two slots are aligned, and the first plate 21*a* is slid onto the second plate 21*b* to form the cross-shaped baffle locator 21 shown in FIG. 11. The first and second plates 21*a*, 21*b* are each preferably beveled on the top outer end of each plate; that is, each plate comprises a first end and a second end, and the first and second ends of each plate are angled at approximately forty-five (45) degrees, with the angled (or tapered) portion of the plate extending to approximately the center line of the outer edge of the plate. The purpose of the baffle locators 21 is to facilitate the positioning of the baffle members 2 on the truck body floor 15, and the angled portion of the baffle locator makes it easier to fit the cylindrical baffle body 4 on top of the baffle locator 21.

Because the floor 15 of the truck body is slanted or sloped (both side to center and front to back, as described above), the baffle locators 21 need to account for this slope in the floor 15. A preferred approach is to alter the height of each of the plates 21*a*, 21*b* to accommodate the slope in the floor. In FIG. 11, the height of the first plate 21*a* is slightly greater on one end (the front end, in this figure) than it is on the other end, and the height of the second plate 21*b* is slightly greater on one end (the right end, in this figure) than it is on the other end. Note that the alteration in height of the plates must be gradual to correspond to the gradual slope in the floor 15. In this manner, the plates 21*a*, 21*b* maintain their perpendicular orientation vis-à-vis one another while allowing the tops of the joined plates to be parallel to the top of the portal.

Figure 12:
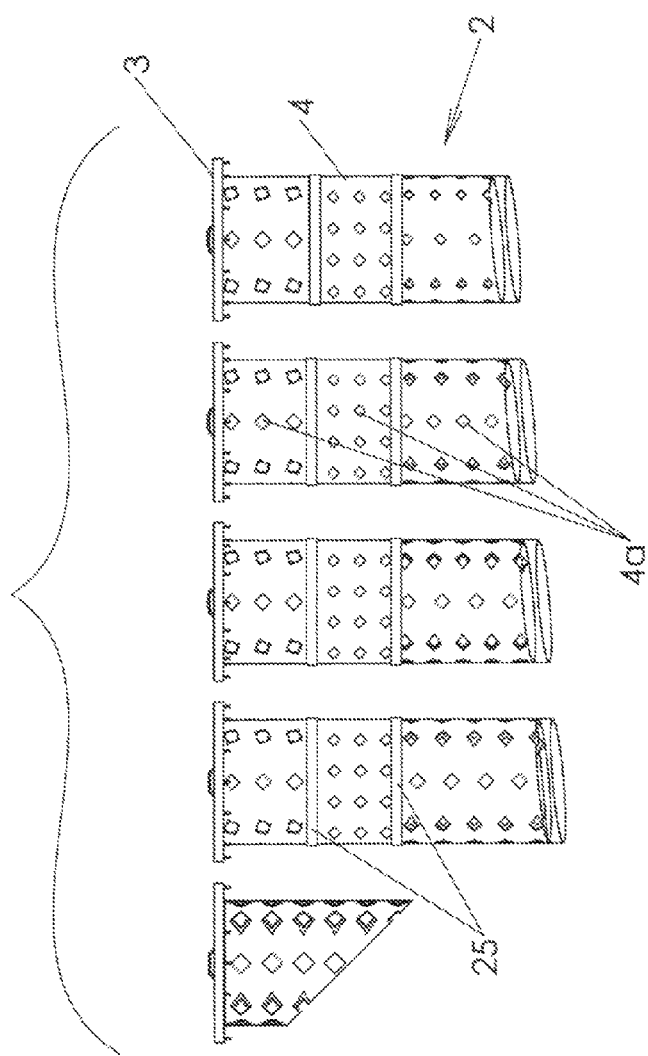
FIG. 12 is a side view of the baffle members of the present invention.

FIG. 12 is a side view of the baffle members of the present invention. As shown in this figure, each baffle member 2 comprises a top plate 3 and a cylindrical baffle body 4 that is preferably centered on and welded to the top plate 3. The baffle body 4 has a plurality of apertures or perforations 4*a* that extend from the top to the bottom of the baffle body 4 and that extend around the entire circumference of the baffle body 4. The perforations allow liquid to move from the inside to the outside of the baffle body 4 and vice versa. (Note that these perforations 4*a* are perpetually open and are not closable via a gate or other structure.) The purpose of the baffle members 2 is to reduce sloshing within the compartment of the truck body. The present invention is not limited to any particular number, size or configuration of perforations in the baffle body 4. This figure also shows the slanted bottom ends of the baffle members 2, which correspond to the slant (rear to front) in the floor 15 (not shown) of the truck body.

FIG. 13 is a bottom perspective view of the baffle members of the present invention. This figure clearly shows the top plates 3 and baffle bodies 4 of each baffle member 2. As shown, the top of the baffle body 2 is preferably centered on and welded to the bottom surface of the top plate 3. The bottom ends of the baffle bodies 4 are open so that the baffle body 4 can be positioned over the top of the baffle locator 21 (not shown).

Figure 14:
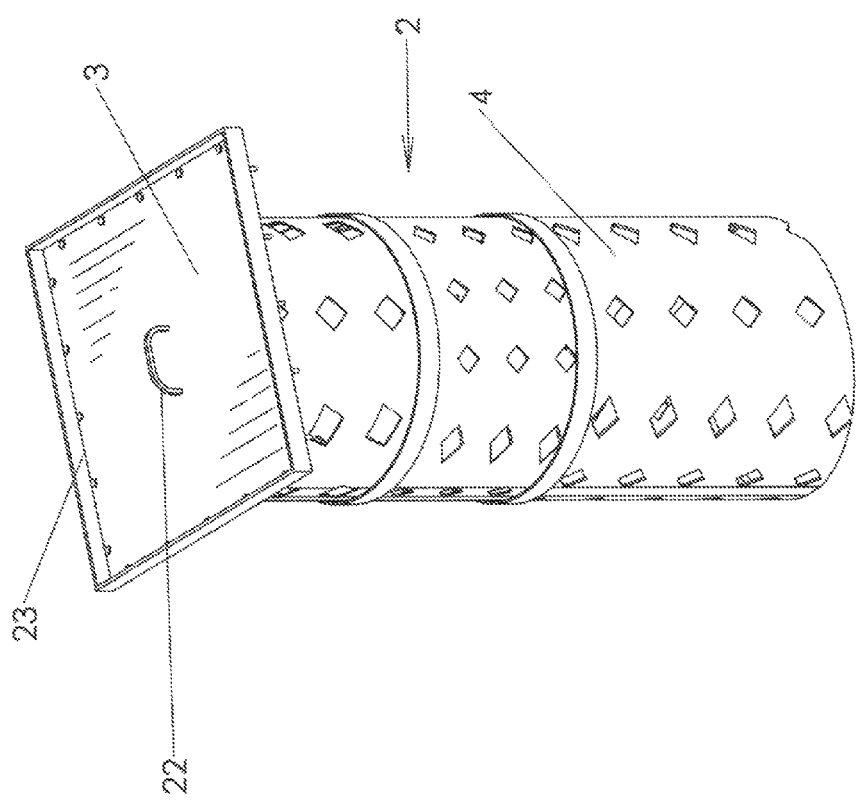
FIG. 14 is a perspective view of a single baffle member.

FIG. 14 is a perspective view of a single baffle member. In a preferred embodiment, the top plate 3 of each baffle member 2 comprises a handle 22 and an upwardly extending rim 23 that extends around the perimeter of the top plate 3. The rim 23 allows the top plate 3 to fit more securely within the portal formed by the top part 17*a* of the tubular support structure (see FIG. 16).

Figure 15:
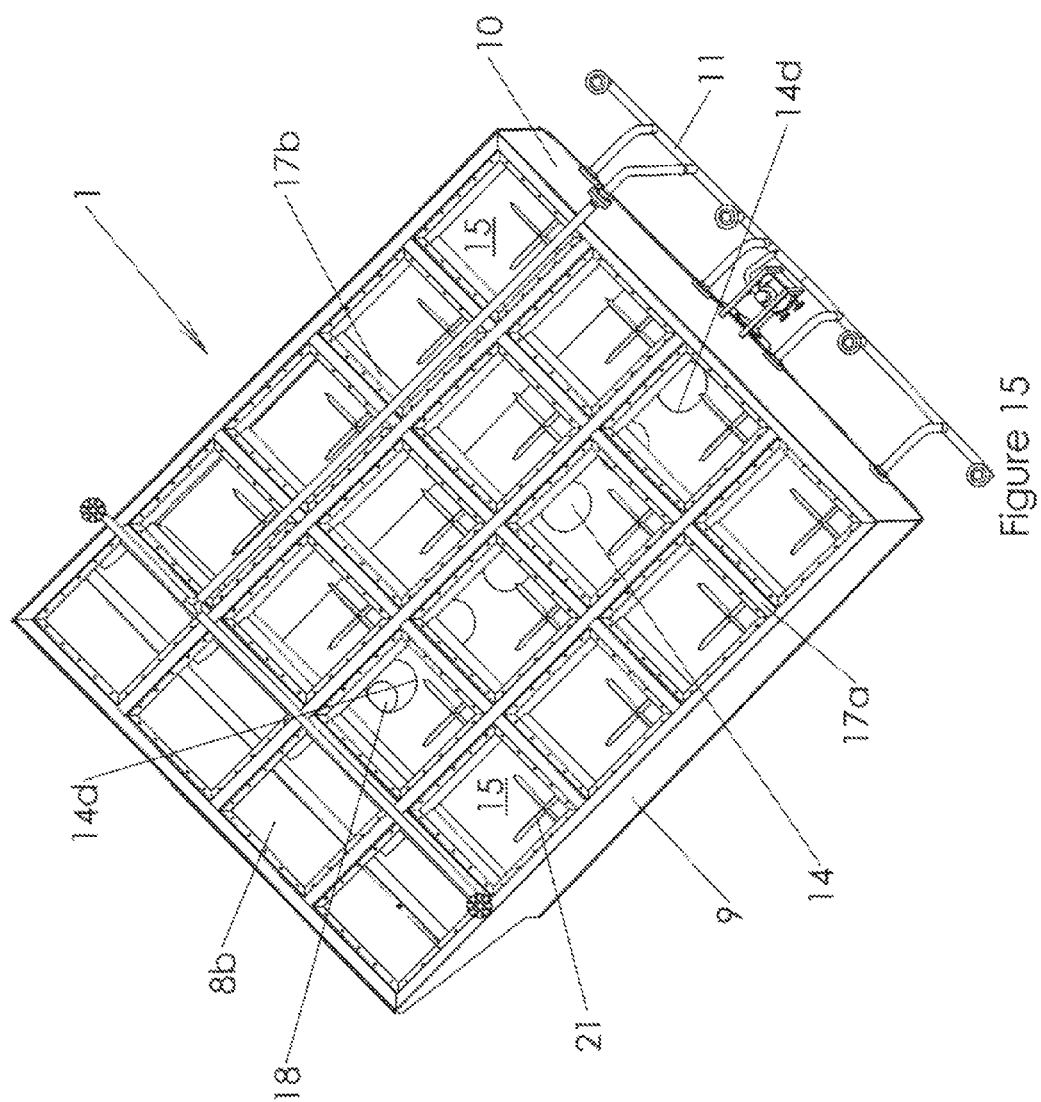
FIG. 15 is a top perspective view of the present invention shown with the truck chassis omitted and the baffle members removed.

FIG. 15 is a top perspective view of the present invention shown with the truck chassis omitted and the baffle members removed. This figure shows the baffle locators 21 and apertures 14*d* in the floor of the truck body 15 in relation to the tubular support structure 17*a*, 17*b*.

Figure 16:
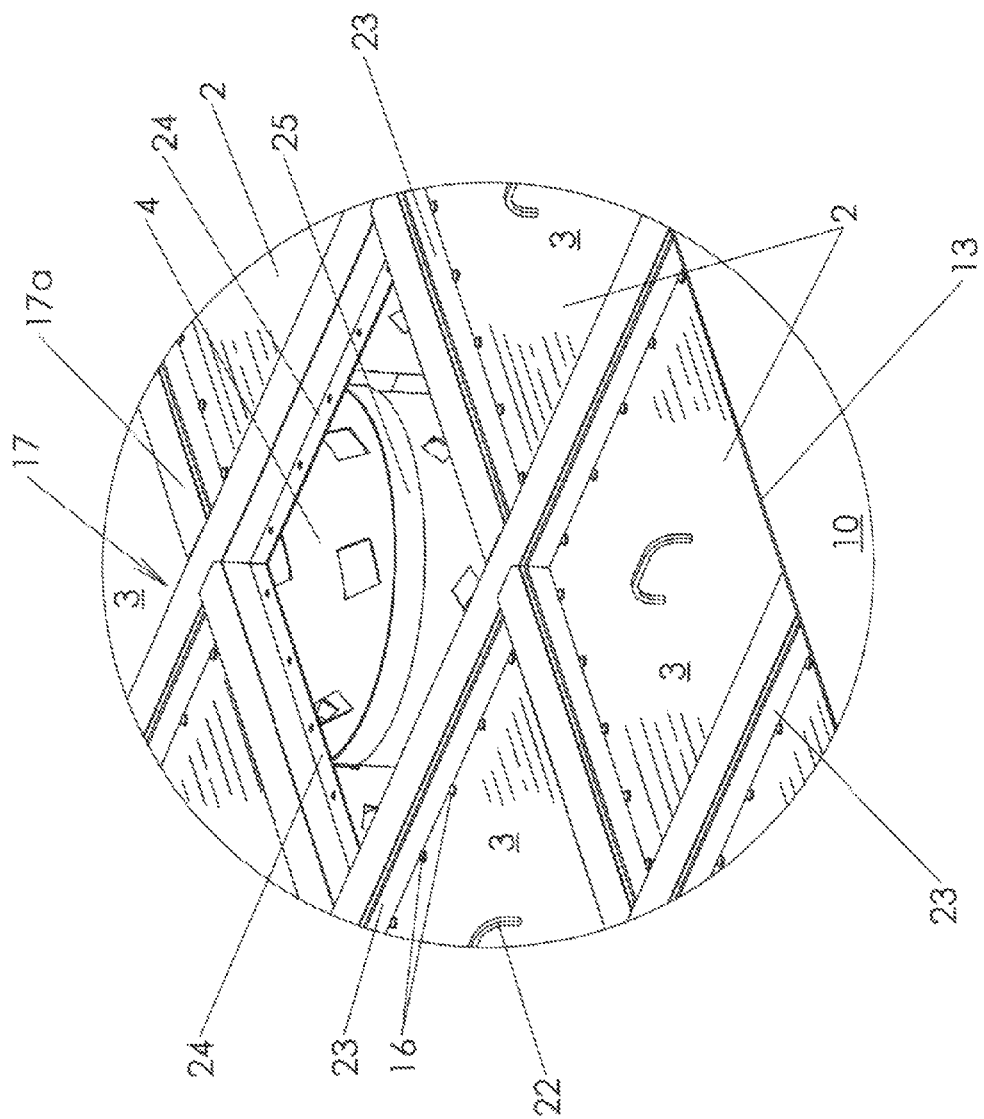
FIG. 16 is a detail perspective view of a portal formed by the top part of the tubular support structure.

FIG. 16 is a detail perspective view of a portal formed by the top part of the tubular support structure. As shown in this figure, the top part 17*a* of the tubular support structure 17 comprises a platform 24 extending inward around the perimeter (and at the bottom) of each of the portals formed by the top part 17*a* of the tubular support structure. This platform 24 anchors the top plate 3 in that the bottom surface of the top plate 3 rests upon this platform. The depth of the platform 24 is preferably no greater than the height of the top part 17*a* of the tubular support structure.

Figure 17:
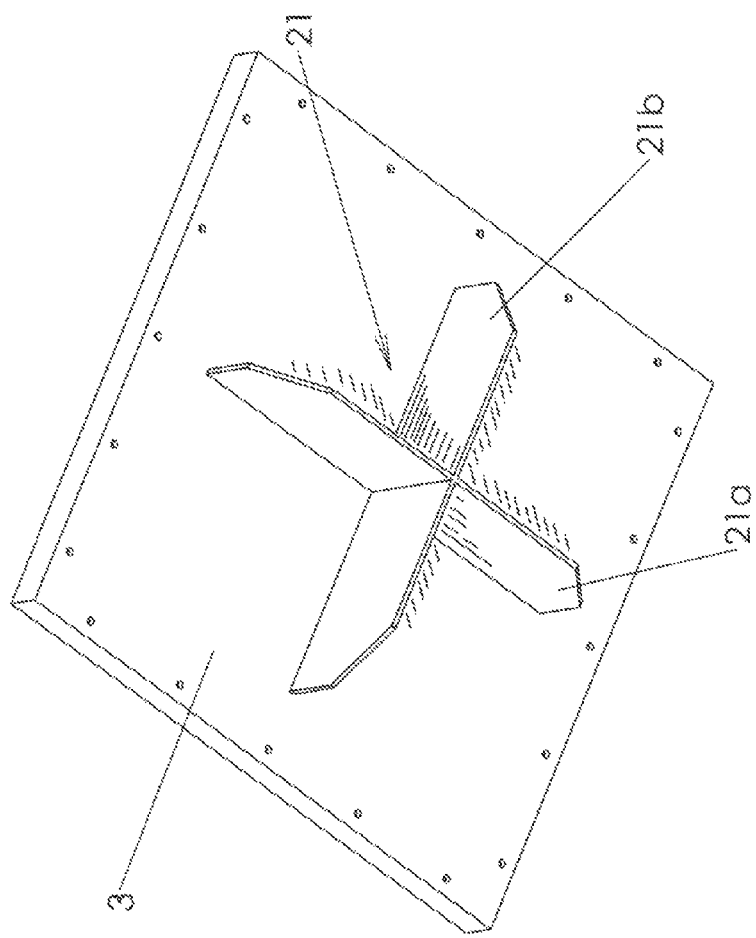
FIG. 17 is a bottom perspective view of an alternate embodiment of the top plate.

In an alternate embodiment (see FIG. 17), the bottom of the top plate 3 is not welded to the top of the baffle body 4. Instead, a baffle locator 21 is welded to and centered on the bottom surface of the top plate 3. The baffle locator 21 is constructed as described above (relative to the baffle locators 21 on the floor 15) except that it does not need to be elongated in terms of height to accommodate for the uneven floor; in other words, the first and second plates 21*a*, 21*b* are the same height. In this embodiment, the baffle body 4 is placed over the locator 21 on the floor 15 of the truck body, and then the locator 21 on the underside of the top plate 3 is situated on top and inside of the baffle body 4 to center the baffle body 4 on the top plate 3. In this embodiment, the baffle body 4 is not welded to either the floor 15 or the top plate 3. The locator 21 serves to center the baffle body 4 within the portal formed by the top part of the tubular support structure.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A water truck body comprising a floor, two side walls, a front wall, and a rear wall, a plurality of cylindrical baffle bodies with open bottom ends, a top plate situated on top of each of the cylindrical baffle bodies so that the cylindrical baffle body is centered underneath the top plate, and a tubular support structure;
   wherein each of the plurality of cylindrical baffle bodies comprises a plurality of apertures configured to permit liquid to flow through them; and
   wherein the tubular support structure is configured to hold the top plates and provide structural stability to the side walls, front wall and rear wall.

2. The water truck body of claim 1, wherein the cylindrical baffle bodies are arranged in lateral and longitudinal rows within the truck body.

3. The water truck body of claim 1, wherein the apertures in the cylindrical baffle bodies extend from top to bottom of the baffle body and around an entire circumference of the baffle body.

4. The water truck body of claim 1, further comprising a trough that extends downward from a center of a bottom surface of the floor and a plurality of apertures in the center of the bottom surface of the floor to allow liquid to drain from the truck body into the trough.

5. The water truck body of claim 4, wherein the floor has a first side and a second side, and wherein the floor slopes downward from the first side to a center of the floor and from the second side to the center of the floor so as to direct liquid to the center of the floor and into the trough via the apertures in the center of the bottom surface of the floor.

6. The water truck body of claim 4, further comprising a first horizontally oriented access porthole at a front of the trough and a second vertically oriented access porthole situated in a rear wall of the trough.

7. The water truck body of claim 6, wherein the trough comprises two side walls that diminish in length from rear to front and terminate at a point directly above the first access porthole.

8. The water truck body of claim 1, further comprising an inlet comprised of a perforated top plate and four contiguous side walls that extend upward from the perforated top plate at an angle to form a funnel for directing liquid into the inlet and through the perforated top plate, the perforated top plate being situated within a first part of the tubular support frame.

9. The water truck body of claim 1, wherein the front wall, two side walls, and rear wall form a compartment that contains the baffle bodies, wherein each of the top plates has a top surface, wherein the compartment has a top edge, and wherein the top surfaces of the top plates are lower than the top edge of the compartment to form a spill lip around a perimeter of the compartment.

10. The water truck body of claim 1, wherein the tubular support structure is comprised of a grid of tubular support members that extend laterally and longitudinally across an inside of the compartment.

11. The water truck body of claim 10, wherein the tubular support structure is comprised of a first part that is situated in a top part of the compartment and a second part that is situated in a center of the compartment.

12. The water truck body of claim 11, wherein the first part of the tubular support structure forms a plurality of portals that hold the top plates.

13. The water truck body of claim 12, wherein each of the portals comprises a platform that extends inwardly around the perimeter of the portal and that is configured to hold a bottom surface of the top plate.

14. The water truck body of claim 1, further comprising a baffle locator situated on the floor directly underneath each of the portals, the baffle locator being comprised of metal plates configured to form a cross shape with tapered ends to facilitate placement of a bottom end of the baffle body over the baffle locator.

15. The water truck body of claim 1, where each of the top plates comprise a baffle locator situated and centered on a bottom surface of the top plate, the baffle locator being comprised of metal plates configured to form a cross shape with tapered ends to facilitate placement of a top end of the baffle body over the baffle locator.

16. The water truck body of claim 1, wherein the floor is slanted downward from the rear wall to the front wall so that the floor is higher where it joins the rear wall than where it joins the front wall.

17. The water truck body of claim 1, wherein each of the baffle bodies comprises one or more coupler rings that secure joints between different sections of the cylindrical baffle body.

18. The water truck body of claim 1, wherein each of the top plates comprises a handle and an upwardly extending rim that extends around a perimeter of the top plate.

* * * * *